(12) United States Patent
Ando et al.

(10) Patent No.: US 9,133,891 B2
(45) Date of Patent: Sep. 15, 2015

(54) FRICTION CLUTCH PLATE, FRICTION CLUTCH AND DRIVING FORCE TRANSMISSION APPARATUS

(71) Applicant: JTEKT Corporation, Osaka-shi (JP)

(72) Inventors: Junji Ando, Anjo (JP); Hiroyuki Ando, Takahama (JP); Takuya Tsuda, Tokorozawa (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/952,018

(22) Filed: Jul. 26, 2013

(65) Prior Publication Data

US 2014/0027236 A1 Jan. 30, 2014

(30) Foreign Application Priority Data

Jul. 27, 2012 (JP) .................................. 2012-167138
Jul. 1, 2013 (JP) .................................. 2013-138342

(51) Int. Cl.
| | | |
|---|---|---|
| *F16D 13/74* | (2006.01) | |
| *F16D 13/64* | (2006.01) | |
| *F16D 27/115* | (2006.01) | |
| *F16D 13/38* | (2006.01) | |
| *F16D 27/04* | (2006.01) | |
| *F16D 69/00* | (2006.01) | |

(52) U.S. Cl.
CPC .............. *F16D 13/64* (2013.01); *F16D 13/385* (2013.01); *F16D 13/648* (2013.01); *F16D 27/04* (2013.01); *F16D 27/115* (2013.01); *F16D 13/74* (2013.01); *F16D 2069/004* (2013.01)

(58) Field of Classification Search
None
See application file for complete search history.

(56) References Cited

U.S. PATENT DOCUMENTS

| | | | |
|---|---|---|---|
| 4,597,484 A * | 7/1986 | Takiguchi et al. ....... | 192/107 M |
| 7,677,375 B2 | 3/2010 | Sakai et al. | |
| 2003/0106758 A1 | 6/2003 | Hirota et al. | |
| 2007/0108009 A1 | 5/2007 | Ando et al. | |

FOREIGN PATENT DOCUMENTS

JP  2005-36863  2/2005

OTHER PUBLICATIONS

U.S. Appl. No. 14/071,828, filed Nov. 5, 2013, Tsuda.
Extended Search Report issued Oct. 24, 2013 in European Patent Application No. 13177952.2

* cited by examiner

*Primary Examiner* — Gene Crawford
*Assistant Examiner* — Mark Manley
(74) *Attorney, Agent, or Firm* — Oblon, McClelland, Maier & Neustadt, L.L.P.

(57) ABSTRACT

A clutch plate arranged to face a contact object so as to be relatively rotatable and relatively movable includes a contact surface being able to contact the contact object via lubricant and a minute groove open at the contact surface and formed of a plurality of groove portions having a predetermined groove pitch. A ratio of a contact area of the contact surface to an area obtained by adding an opening area of the minute groove to the contact area of the contact surface is 90% to 96% in an initial state.

18 Claims, 7 Drawing Sheets

FRICTION CLUTCH PLATE, FRICTION CLUTCH AND DRIVING FORCE TRANSMISSION APPARATUS

INCORPORATION BY REFERENCE

The disclosure of Japanese Patent Application No. 2012-167138 and 2013-138342 filed on Jul. 27, 2012 and Jul. 1, 2013 including the specification, drawings and abstract is incorporated herein by reference in its entirety.

BACKGROUND OF THE INVENTION

1. Field of the Invention

The invention relates to a friction clutch plate, a friction clutch and a driving force transmission apparatus.

2. Description of Related Art

There is a driving force transmission apparatus that includes friction clutch plates each having a plurality of minute grooves open at a sliding surface side in order to improve durability by suppressing abrasion of a contact surface (sliding surface) (for example, Japanese Patent Application Publication No. 2005-36863 (JP 2005-36863 A)).

In such a driving force transmission apparatus, the oil film thickness of lubricant that is interposed between each of the above-described friction clutch plates and an adjacent one of friction clutch plates, which is relatively rotatable with respect to the above-described friction clutch plates, is kept at an appropriate size. Thus, dependence of coefficient of friction μ on a slip velocity v between both friction clutch plates (μ-v characteristic) has a positive gradient ($\delta\mu/\delta v \geq 0$), so it is possible to ensure a favorable driving force transmission characteristic that has excellent judder resistance.

SUMMARY OF THE INVENTION

Incidentally, in the above-described driving force transmission apparatus, the sliding surface of each friction clutch plate desirably keeps the favorable driving force transmission characteristic even at the time of a lapse of a period of service that is assumed as the life of the apparatus. Therefore, it is required to maintain appropriate minute grooves even when the sliding surface abrades due to usage over an extended period of time and to keep a favorable state of oil film on the sliding surface.

However, in the driving force transmission apparatus, each of the minute grooves of each friction clutch plate has a substantially triangular shape in cross section with a groove width that gradually narrows from its opening to its bottom, so the sliding surface is narrow and the contact pressure is high particularly in an initial usage (at the time when initially placed in a distribution process of a market). Therefore, a reduction in the groove width of each minute groove due to abrasion of the sliding surface is remarkable, and the driving force transmission characteristic may significantly vary between in the initial usage and after usage for an extended period of time.

On the other hand, in a driving force transmission apparatus, it is important that torque that is transmitted between both friction clutch plates (transmitted torque) does not depend on the temperature of lubricant, which is interposed between both friction clutch plates, as much as possible even when there is a temperature change in the lubricant. It is generally known that, as shown in FIG. 9, the transmitted torque is the sum (A)+(B) of a torque (A) based on contact of solid and a torque (B) based on shear of fluid (lubricant). It appears from FIG. 9 that the transmitted torque (Nm) based on contact of solid indicates a substantially constant value and almost does not depend on the temperature (° C.) of lubricant; whereas the transmitted torque based on shear of fluid significantly varies at low temperatures of lubricant. This is presumably because the viscosity of lubricant is higher at low temperatures than at high temperatures.

Therefore, the driving force transmission apparatus is desired to have a small variation in transmitted torque even when the viscosity of lubricant increases or decreases due to a temperature change, that is, to have a low temperature dependence.

It is an object of the invention to provide a friction clutch plate, a friction clutch and a driving force transmission apparatus that have a low temperature dependence and that are able to maintain a favorable driving force transmission characteristic over an extended period of time.

A first aspect of the invention provides a friction clutch plate that is arranged to face a contact object so as to be relatively rotatable and relatively movable. The friction clutch plate includes: a contact surface configured to be able to contact the contact object via lubricant; and a minute groove open at the contact surface and formed of a plurality of groove portions having a predetermined groove pitch, wherein a ratio of a contact area of the contact surface to an area obtained by adding an opening area of the minute groove to the contact area of the contact surface is 90% to 96% in an initial state.

In the above friction clutch plate, the minute groove may be set such that the groove pitch of the plurality of groove portions falls within the range of 400 μm to 600 μm.

In the above friction clutch plate, the contact surface may face a diamond-like carbon coating provided on the contact object.

In the above friction clutch plate, an area of the groove portions in cross section perpendicular to an extending direction of the groove portions may be set to fall within the range of 200 μm² to 700 μm².

In the above friction clutch plate, the plurality of groove portions of the minute groove may be independent of each other and may be arranged concentrically as annular recessed grooves.

In the above friction clutch plate, each of the groove portions may have a trapezoidal shape in cross section perpendicular to an extending direction of the groove portions.

A second aspect of the invention provides a friction clutch. The friction clutch includes a plurality of clutch plates of which any adjacent two clutch plates are configured to be able to frictionally engage with each other, wherein one of the any adjacent two clutch plates among the plurality of clutch plates is the above-described friction clutch plate.

A third aspect of the invention provides a driving force transmission apparatus. The driving force transmission apparatus includes: a first rotating member configured to rotate by driving torque of a drive source; a second rotating member arranged relatively rotatably with respect to the first rotating member along a rotation axis of the first rotating member; a first friction clutch configured to couple the second rotating member to the first rotating member so as to be able to interrupt the second rotating member from the first rotating member; an electromagnetic clutch arranged next to the first friction clutch along the rotation axis; a second friction clutch configured to be actuated by clutch action of the electromagnetic clutch; and a cam mechanism configured to receive rotational force from the first rotating member by clutch action of the second friction clutch and then convert the rotational force to cam thrust force that becomes clutch action force of the first friction clutch, wherein at least one of the first friction clutch and the second friction clutch is the above friction clutch.

According to the aspects of the invention, it is possible to maintain a favorable driving force transmission characteristic having a low temperature dependence over an extended period of time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a friction clutch plate, a friction clutch and a driving force transmission apparatus according to an embodiment of the invention will be described in detail with reference to the accompanying drawings.

Figure 1:
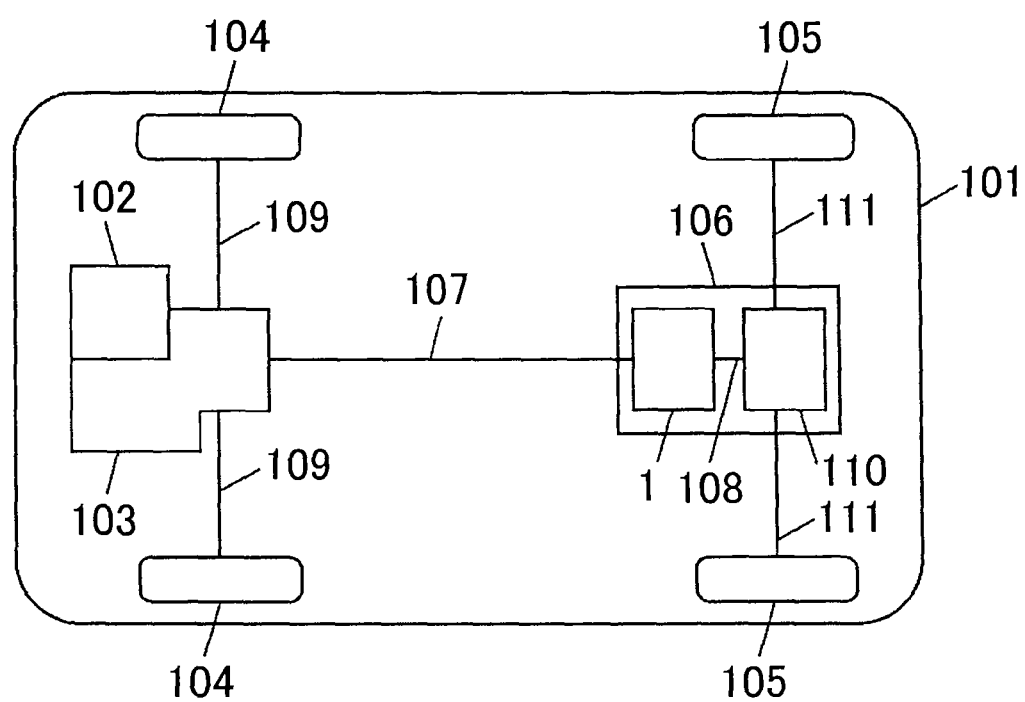
FIG. 1 is a plan view for schematically illustrating a vehicle on which a driving force transmission apparatus according to a first embodiment of the invention is mounted.

FIG. 1 schematically shows a four wheel drive. As shown in FIG. 1, the four wheel drive 101 includes a driving force transmission apparatus 1, an engine (drive source) 102, a transaxle 103, a pair of front wheels 104 and a pair of rear wheels 105.

The driving force transmission apparatus 1 is arranged in a driving force transmission path from a front wheel side to a rear wheel side in the four wheel drive 101, and is mounted on a vehicle body (not shown) of the four wheel drive 101 via a differential carrier 106.

The driving force transmission apparatus 1 couples a propeller shaft 107 to a drive pinion shaft 108 in a torque transmittable manner, and transmits the driving force of the engine 102 to the rear wheels 105 in this coupled state. The details of the driving force transmission apparatus 1 will be described later.

The engine 102 drives the front wheels 104 by outputting the driving force to front axle shafts 109 via the transaxle 103.

In addition, the engine 102 drives the rear wheels 105 by outputting the driving force to the propeller shaft 107, the driving force transmission apparatus 1, the drive pinion shaft 108, a rear differential 110 and rear axle shafts 111 via the transaxle 103.

Figure 2:
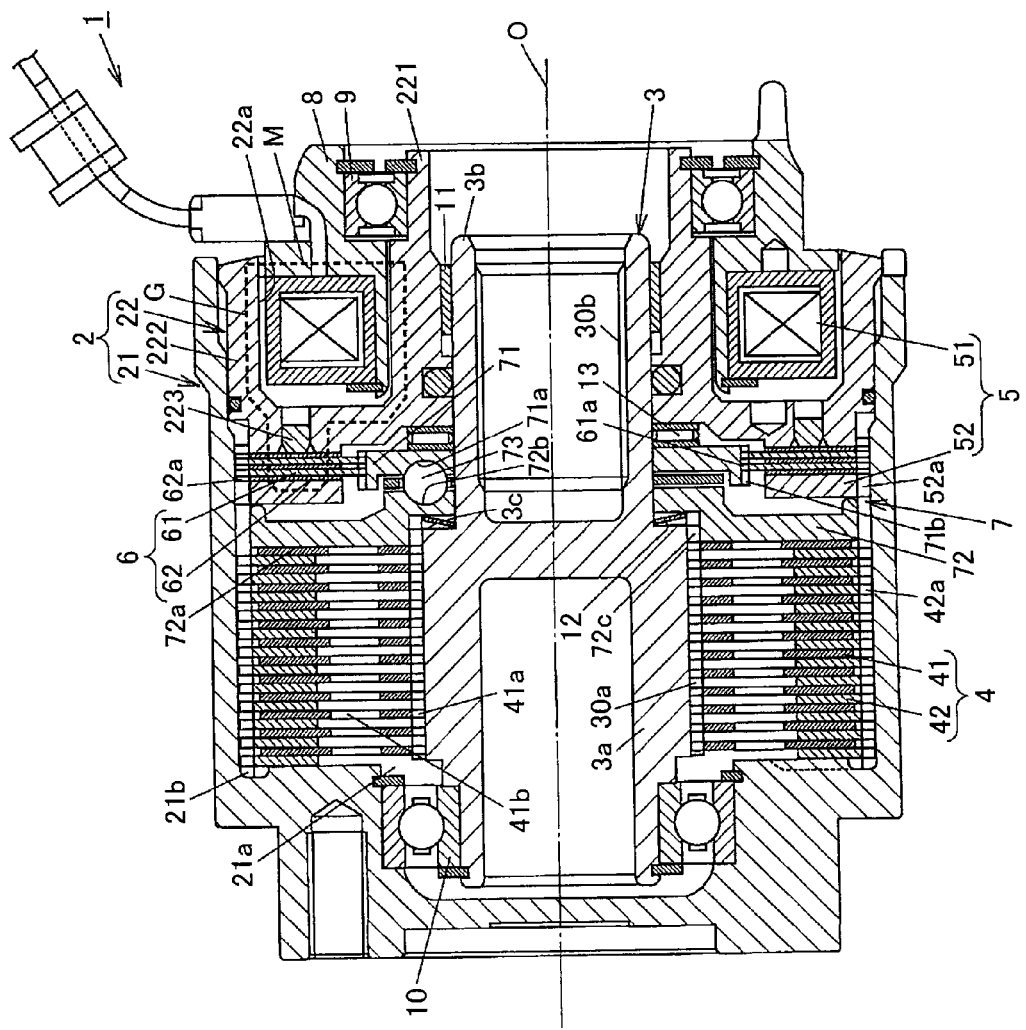
FIG. 2 is a sectional view for illustrating the driving force transmission apparatus according to the first embodiment of the invention.

FIG. 2 shows the entire driving force transmission apparatus. As shown in FIG. 2, the driving force transmission apparatus 1 is roughly formed of a housing 2, an inner shaft 3, a main clutch 4, an electromagnetic clutch 5, a pilot clutch 6 and a cam mechanism 7. The housing 2 serves as a first rotating member that is relatively rotatable with respect to a coupling case (not shown) of the differential carrier 106 (shown in FIG. 1). The inner shaft 3 serves as a second rotating member that is relatively rotatable with respect to the housing 2. The main clutch 4 serves as a first friction clutch that couples the inner shaft 3 to the housing 2 so as to be able to interrupt the inner shaft 3 from the housing 2. The electromagnetic clutch 5 is arranged next to the main clutch 4 along a rotation axis O of the housing 2 and the inner shaft 3. The pilot clutch 6 serves as a second friction clutch that is actuated through clutch action of the electromagnetic clutch 5. The cam mechanism 7 converts rotational force, received from the housing 2 through the clutch action of the pilot clutch 6, to cam thrust force that becomes clutch action force of the main clutch 4.

The housing 2 includes a front housing 21 and a rear housing 22, and is rotatably accommodated in the coupling case. The housing 2 rotates around the rotation axis O by the driving torque of the engine 102 (shown in FIG. 1).

The front housing 21 has an accommodating space 21a and a straight spline fitting portion 21b. The accommodating space 21a is open toward the rear housing side. The straight spline fitting portion 21b is exposed to the accommodating space 21a. The front housing 21 is coupled to the engine 102 (shown in FIG. 1) via the transaxle 103 (shown in FIG. 1), the propeller shaft 107 (shown in FIG. 1), and the like, and is rotatably supported in the coupling case via a bearing (not shown). The entire front housing 21 is formed of a closed-end cylindrical member. The front housing 21 rotates around the rotation axis O together with the rear housing 22 upon reception of the driving force of the engine 102 from the propeller shaft 107.

The rear housing 22 is formed of first to third housing elements 221 to 223. The rear housing 22 is screwed to the inner periphery of the opening of the front housing 21, and is rotatably supported by a coil holder 8 in the coupling case via a bearing 9. The rear housing 22 has an annular accommodating space 22a that opens toward a side opposite to the main clutch 4 side.

The inner shaft 3 has two large and small cylindrical portions 3a, 3b, a step surface 3c, and the like. The cylindrical portions 3a, 3b have mutually different outside diameters. The step surface 3c is interposed between these cylindrical portions 3a, 3b. The inner shaft 3 is arranged along the rotation axis O of the housing 2 and is relatively rotatably supported by the housing 2 via bearings 10, 11. The entire inner shaft 3 is formed of a cylindrical member. The inner shaft 3 accommodates the distal end portion of the drive pinion shaft 108 (shown in FIG. 1) by allowing the distal end portion of the drive pinion shaft 108 to be inserted in its rear housing-side opening. The drive pinion shaft 108 is coupled to the inside of the rear housing-side opening of the inner shaft 3 by spline fitting so as to be relatively non-rotatable and relatively movable.

The main clutch 4 includes a plurality of inner clutch plates 41 and a plurality of outer clutch plates 42. The main clutch 4 is arranged between the front housing 21 (housing 2) and the inner shaft 3 and is accommodated in the accommodating space 21a. The main clutch 4 frictionally engages any adjacent two clutch plates of the inner clutch plates 41 and the outer clutch plates 42 with each other or releases the frictional engagement. Thus, the main clutch 4 couples the housing 2 to the inner shaft 3 (in a torque transmittable manner) so as to be able to interrupt the housing 2 from the inner shaft 3.

The inner clutch plates 41 and the outer clutch plates 42 are alternately arranged along the rotation axis O, and are entirely formed of annular members that allow the inner shaft 3 to be inserted therethrough.

The inner clutch plates 41 have straight spline fitting portions 41a at their inner peripheral portions. The inner clutch plates 41 are coupled to the inner shaft 3 by fitting the straight spline fitting portions 41a to a straight spline fitting portion 30a of the cylindrical portion 3a (inner shaft 3) so as to be relatively non-rotatable and relatively movable.

The inner clutch plates 41 each have oil holes 41b that are arranged in the circumferential direction and that open toward the rotation axis O.

The outer clutch plates 42 have straight spline fitting portions 42a at their outer peripheral portions. The outer clutch plates 42 are coupled to the housing 2 by fitting the straight spline fitting portions 42a to the straight spline fitting portion 21b of the front housing 21 (housing 2) so as to be relatively non-rotatable and relatively movable.

The electromagnetic clutch 5 includes an electromagnetic coil 51 and an armature 52. The electromagnetic clutch 5 is arranged along the rotation axis O of the housing 2. The electromagnetic clutch 5 actuates the pilot clutch 6 by movement of the armature 52 toward the electromagnetic coil 51 side due to generation of electromagnetic force at the time of rotation of the housing 2, and frictionally engages inner clutch plates 61 and outer clutch plates 62 (both will be described later) of the pilot clutch 6 with each other.

The electromagnetic coil 51 is accommodated in the accommodating space 22a of the rear housing 22, and is installed in the coupling case via the coil holder 8. The electromagnetic coil 51 forms a magnetic circuit M over the rear housing 22, the armature 52, and the like, by being supplied with current and generates electromagnetic force for applying force to the armature 52 to move toward the rear housing 22.

The armature 52 is arranged between a main cam 72 (described later) and the rear housing 22, and is accommodated in the accommodating space 21a of the front housing 21 by allowing the inner shaft 3 to be inserted therethrough. The armature 52 is entirely formed of an annular member made of a magnetic material, such as iron. The armature 52 moves along the rotation axis O of the housing 2 toward the rear housing 22 upon reception of the electromagnetic force of the electromagnetic coil 51.

The armature 52 has a straight spline fitting portion 52a that is spline-fitted to the straight spline fitting portion 21b of the front housing 21.

The pilot clutch 6 includes a plurality of the inner clutch plates 61 and a plurality of the outer clutch plates 62. The pilot clutch 6 is arranged between the front housing 21 (housing 2) and a pilot cam 71 (described later) of the cam mechanism 7 and is accommodated in the accommodating space 21a of the front housing 21. The pilot clutch 6 frictionally engages any adjacent two clutch plates of the inner clutch plates 61 and the outer clutch plates 62 with each other or releases the frictional engagement. Thus, the pilot clutch 6 couples the housing 2 to the pilot cam 71 (in a torque transmittable manner) so as to be able to interrupt the housing 2 from the pilot cam 71.

The inner clutch plates 61 and the outer clutch plates 62 are alternately arranged along the rotation axis O, and each are entirely formed of an annular member that allows the inner shaft 3 to be inserted therethrough.

The inner clutch plates 61 have straight spline fitting portions 61a at their inner peripheral portions. The inner clutch plates 61 are coupled to the pilot cam 71 by fitting the straight spline fitting portions 61a to a straight spline fitting portion 71b of the pilot cam 71 so as to be relatively non-rotatable and relatively movable.

The outer clutch plates 62 have straight spline fitting portions 62a at their outer peripheral portions. The outer clutch plates 62 are coupled to the housing 2 by fitting the straight spline fitting portions 62a to the straight spline fitting portion 21b of the front housing 21 (housing 2) so as to be relatively non-rotatable and relatively movable.

The cam mechanism 7 includes the pilot cam 71, the main cam 72 and a plurality of (six in the embodiment) cam followers 73. The pilot cam 71 rotates upon reception of rotational force from the housing 2. The main cam 72 is arranged next to the pilot cam 71 along the rotation axis O of the housing 2. The cam followers 73 are interposed between the main cam 72 and the pilot cam 71. The cam mechanism 7 is arranged between the main clutch 4 and the rear housing 22, and is accommodated in the accommodating space 21a of the front housing 21. As described above, the cam mechanism 7 receives rotational force from the housing 2 through clutch action of the pilot clutch 6, and converts the rotational force to cam thrust force that becomes clutch action force of the main clutch 4.

The pilot cam 71 is arranged around the cylindrical portion 3b (inner shaft 3) at the rear housing 22 side of the cam mechanism 7, and is rotatably supported by the rear housing 22 via a bearing 13. The pilot cam 71 is entirely formed of an annular member that allows the inner shaft 3 to be inserted therethrough.

The pilot cam 71 has a plurality of (six in the embodiment) cam grooves 71a that are arranged in its circumferential direction and that open toward the cam followers 73. The pilot cam 71 has the straight spline fitting portion 71b at its outer peripheral portion. The straight spline fitting portion 71b is spline-fitted to the straight spline fitting portions 61a of the inner clutch plates 61 of the pilot clutch 6.

The main cam 72 has a clutch plate pressing portion 72a that presses the input-side inner clutch plate 41 of the main clutch 4 upon reception of cam thrust force, which is generated through rotation of the pilot cam 71, from the cam followers 73. The main cam 72 is coupled to the inner shaft 3 at the main clutch 4 side of the cam mechanism 7 so as to be relatively non-rotatable and relatively movable. The main cam 72 is entirely formed of an annular member that allows the inner shaft 3 to be inserted therethrough.

The main cam 72 has a plurality of (six in the embodiment) cam grooves 72b that are arranged in its circumferential direction and that open toward the cam followers 73. Spring force is constantly applied to the main cam 72 by a main cam return spring 12 in a direction in which the main cam 72 is spaced apart from the main clutch 4. The main cam 72 has a straight spline fitting portion 72c at its inner peripheral portion. The straight spline fitting portion 72c is spline-fitted to the straight spline fitting portion 30a of the inner shaft 3.

The cam followers 73 are interposed between the cam grooves 72b of the main cam 72 and the cam grooves 71a of the pilot cam 71, and each are formed of a spherical member.

Next, the operation of the driving force transmission apparatus according to the present embodiment will be described with reference to FIG. 1 and FIG. 2.

As shown in FIG. 1 and FIG. 2, when the engine 102 of the four wheel drive 101 is started, the rotational driving force of the engine 102 is transmitted to the housing 2 via the transaxle 103, the propeller shaft 107, and the like, and the housing 2 is driven for rotation.

Normally, when the four wheel drive 101 is stopped or is travelling in a steady state, the electromagnetic coil 51 of the electromagnetic clutch 5 is not supplied with current, so the magnetic circuit M having the electromagnetic coil 51 as a starting point is not formed, and the armature 52 does not move toward the electromagnetic coil 51.

Therefore, the pilot clutch 6 and the cam mechanism 7 are not actuated, the inner clutch plates 41 and outer clutch plates 42 of the main clutch 4 do not frictionally engage with each other, and the rotational driving force of the engine 102 is not transmitted from the housing 2 to the inner shaft 3.

In contrast to this, for example, when the electromagnetic coil 51 is supplied with current at the time when the four wheel drive 101 starts travelling (at the time of rotation of the housing 2), the magnetic circuit M is formed, and the armature 52 moves toward the electromagnetic coil 51.

Therefore, the armature 52 is coupled to the housing 2, the pilot clutch 6 is actuated (the inner clutch plates 61 and the outer clutch plates 62 frictionally engage with each other), and the rotational force of the housing 2 is transmitted to the cam mechanism 7 via the pilot clutch 6.

Accordingly, the pilot cam 71 of the cam mechanism 7 rotates, the rotational force is converted to cam thrust force that becomes clutch action force of the main clutch 4 through cam action that occurs in the cam mechanism 7, and the main cam 72 moves due to the cam thrust force in a direction in which the clutch plates of the main clutch 4 frictionally engage with each other.

Thus, the main cam 72 presses the main clutch 4 in a direction in which the clutch plates frictionally engage with each other, the clutch plates of the main clutch 4 frictionally engage with each other, the rotational driving force of the engine 102 is transmitted from the housing 2 to the inner shaft 3, and is further transmitted from the inner shaft 3 to the rear differential 110 via the drive pinion shaft 108. The rotational driving force transmitted to the rear differential 110 is transmitted to the rear wheels 105 via the rear axle shafts 111, and the rear wheels 105 are driven for rotation.

Next, the inner clutch plates 61 and outer clutch plates 62 of the pilot clutch 6 will be described in detail with reference to FIG. 3 to FIG. 5.

Figure 3:
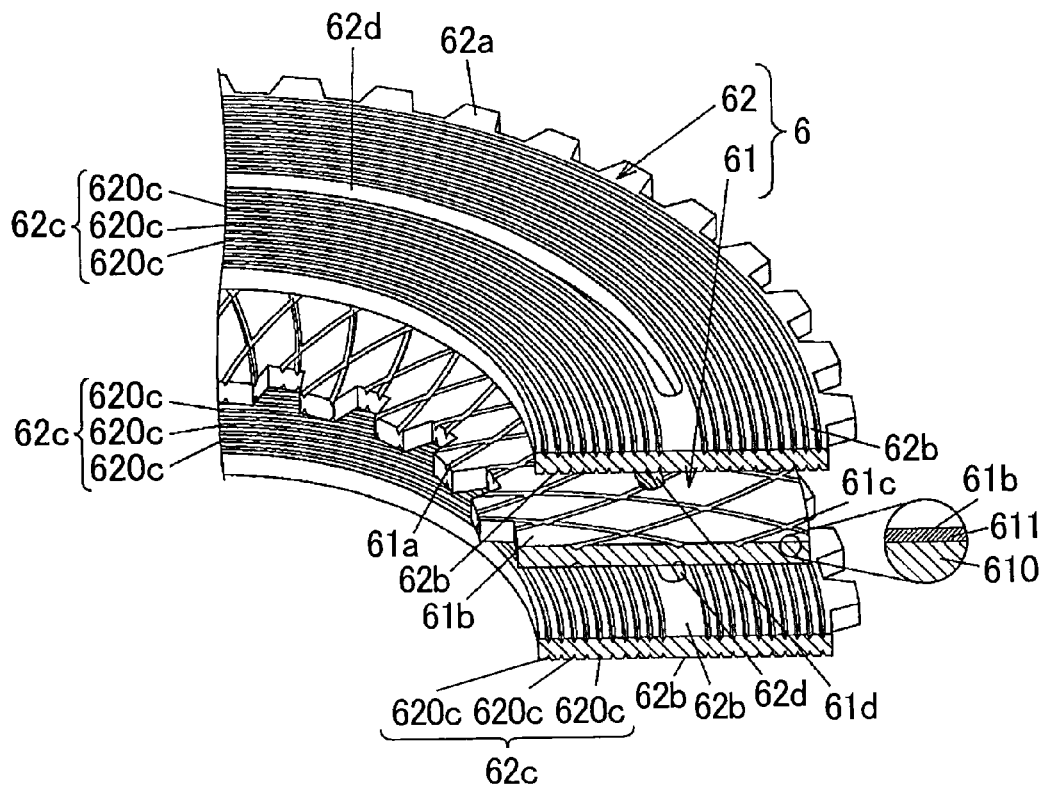
FIG. 3 is a schematic perspective view for illustrating friction clutches in the driving force transmission apparatus according to the first embodiment of the invention.
Figure 4:
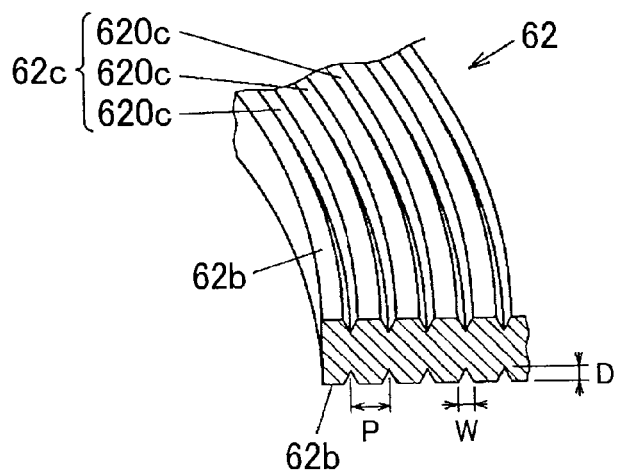
FIG. 4 is a schematic local sectional view for illustrating each friction clutch plate having a minute groove in one of the friction clutches of the driving force transmission apparatus according to the first embodiment of the invention.

As shown in FIG. 3 and FIG. 4, the inner clutch plates 61 and the outer clutch plates 62 each are, for example, formed of an annular friction clutch plate made of a magnetic material (iron-based metal).

Each inner clutch plate 61 has a contact surface (sliding surface) 61b, and is arranged to face the adjacent one of the outer clutch plates 62 so as to be relatively rotatable and relatively movable. Each inner clutch plate 61 functions as a contact object of the adjacent one of the outer clutch plates 62.

Each inner clutch plate 61 has, for example, a planar substantially reticular oil groove 61c that opens at the sliding surface 61b and that is used for draining lubricant that is interposed between the mutually adjacent two of the clutch plates (between the inner clutch plate 61 and the outer clutch plate 62) during friction engagement. Each inner clutch plate 61 is formed by forming a base member 610 made of iron-based metal through machining a recessed groove, or the like, corresponding to the oil groove 61c, on a plate forming raw material and then applying film deposition process for forming a hard thin film on the surface of the base member 610. In the present embodiment, a diamond-like carbon (DLC) coating 611 having a high hardness and an excellent surface smoothness is formed over the entire surface of the base member 610 as the hard thin film. That is, the sliding surface 61b of each inner clutch plate 61 is formed of the diamond-like carbon coating 611.

The diamond-like carbon coating 611 is more specifically a DLC-Si coating that contains silicon (Si). The DLC-Si coating is appropriate when the Si concentration, for example, ranges from 8 percent by mass to 40 percent by mass, and the hardness is desirably higher than or equal to 1000 Hv. A plurality of through-holes 61d are formed at a substantially radially middle portion of each inner clutch plate 61. The through-holes 61d are arranged along the circumferential direction, and function as an air gap for preventing a short circuit of magnetic fluxes.

Each outer clutch plate 62 has a contact surface (sliding surface) 62b and a minute groove 62c. The contact surface (sliding surface) 62b is allowed to contact the sliding surface 61b of the adjacent one of the inner clutch plates 61 via lubricant. The minute groove 62c opens at the sliding surface 62b. Each outer clutch plate 62 is arranged to face the adjacent one of the inner clutch plates 61 so as to be relatively rotatable and relatively movable. That is, the sliding surface 62b of each outer clutch plate 62 faces the diamond-like carbon coating 611 of the adjacent one of the inner clutch plates 61 along the rotation axis O.

Each outer clutch plate 62 is formed by machining recessed grooves, or the like, corresponding to the minute groove 62c, on a plate forming raw material and then applying film deposition process for forming a thin film (not shown). The thin film on each outer clutch plate 62 is, for example, formed over all the plate surface from an oxynitrided film. A plurality of through-holes 62d are formed at a substantially radially middle portion of each outer clutch plate 62. The through-holes 62d are arranged along the circumferential direction and function as an air gap for preventing a short circuit of magnetic fluxes.

As shown in FIG. 4, the minute groove 62c has a predetermined groove pitch P, and is formed of a plurality of groove portions 620c formed of annular recessed grooves having mutually different ring diameters (inside diameters and outside diameters). The groove portions 620c are formed independently of one another, and are arranged concentrically about the axis of each outer clutch plate 62, that is, the axis of relative rotation with respect to the adjacent one of the inner clutch plates 61. The groove portions 620c each have a triangular shape in cross section in the radial direction of each outer clutch plate 62 such that the groove width gradually narrows from the opening toward the bottom. The groove portions 620c are set such that an area α in cross section perpendicular to the extending direction (circumferential direction) of the groove portions 620c falls within 200 $\mu m^2 \leq \alpha \leq 700 \ \mu m^2$.

More specifically, in the present embodiment, the groove portions 620c are, for example, set such that the groove depth D has a size of D=15 μm, the groove width W at the opening has a size of W=40 μm and the groove pitch P falls within 400 $\mu m \leq P \leq 600 \ \mu m$. For the groove portions 620c, the average of the groove width W is W=20 to 50 μm at a portion at which the groove depth D from the sliding surface 62b is D=1.5 μm, and the groove pitch P is set to fall within 400 μm≤P≤600 μm. The groove portions 620c are formed by, for example, pressing work using a die.

Figure 5:
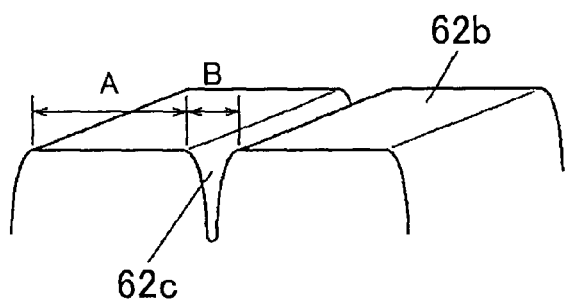
FIG. 5 is a schematic perspective view for illustrating the ratio of an area of a sliding surface (the area ratio of the sliding surface) to an area obtained by adding an opening area of the minute groove to the area of the sliding surface in each friction clutch plate of the one of the friction clutches of the driving force transmission apparatus according to the first embodiment of the invention.

As shown in FIG. 5, an area ratio S of the sliding surface 62b is expressed by S={A/(A+B)}×100(%) where the contact area of the sliding surface 62b is A and the area of the overall plate surface of each outer clutch plate 62 (area obtained by adding an opening area B of the minute groove 62c to the contact area A of the sliding surface 62b) is A+B. In the present embodiment, the area ratio of the sliding surface 62b is set to fall within 90%≤S≤96% in an initial state, that is, an initial usage.

In each of the thus configured outer clutch plates 62, the area ratio S of the sliding surface 62b is set to fall within 90%≤S≤96% that is higher than that in the related art in the initial state, so the driving force transmission characteristic does not vary between in the initial usage and after usage for an extended period of time unlike the related art by suppressing a variation in the groove width and groove depth of the minute groove 62c due to abrasion of the sliding surface 62b, and, therefore, it is possible to maintain a favorable driving force transmission characteristic for an extended period of time.

In each outer clutch plate 62 according to the present embodiment, the groove pitch P of the groove portions 620c is set to fall within 400 μm—P≤600 μm, so it is possible to obtain the driving force transmission characteristic having a low temperature dependence.

Next, the advantageous effect (1) that the favorable driving force transmission characteristic is maintained for an extended period of time and the advantageous effect (2) that the driving force transmission characteristic having a low temperature dependence is obtained will be considered.

This consideration of advantageous effect (1) was conducted as follows. In the driving force transmission apparatus 1, the outer clutch plates 62 respectively having an area ratio S of the sliding surface 62b of S=60%, 80%, 90%, 96%, 98%, and each having a groove depth D of the minute groove 62c of D=15 μm and a groove pitch P of P=500 μm (P=100 μm in the product according to the related art) were prepared, the electromagnetic clutch 5 (cam mechanism 7) was actuated while rotating the housing 2, and then a μ-v gradient for the area ratio S of the sliding surface 62b was measured.

As a result, it was confirmed that the μ-v gradient is a positive gradient (δμ/δv>0) in 60%≤S≤96% and is a relatively gentle positive gradient (desirable range) in 80%≤S≤96% and the favorable driving force transmission characteristic having excellent judder resistance is obtained. Particularly, it was confirmed that the μ-v gradient is a constant positive gradient (δμ/δv=0: optimal range) in 90%≤S≤96% and the driving force transmission characteristic does not significantly vary between in the initial usage and after usage for an extended period of time, that is, the favorable driving force transmission characteristic is maintained for an extended period of time. This leads to excellent controllability of transmitted torque between the inner clutch plates 61 and the outer clutch plates 62 and a suppressed increase in transmitted torque at low temperatures.

Figure 6:
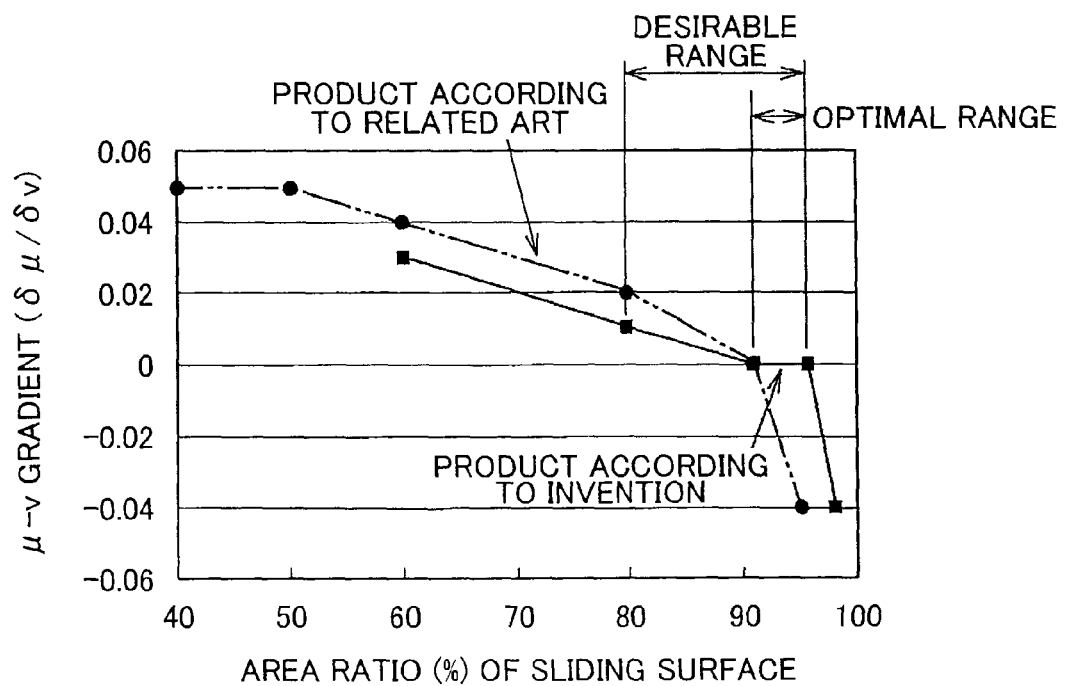
FIG. 6 is a graph that shows the correlation between an area ratio of the sliding surface and a μ-v gradient (dependence of coefficient of friction μ on a slip velocity v) in each friction clutch plate of the one of the friction clutches of the driving force transmission apparatus according to the first embodiment of the invention.

This is as shown in FIG. 6. FIG. 6 shows the results of consideration of the correlation between an area ratio of the sliding surface and a μ-v gradient. In FIG. 6, the continuous line indicates a μ-v gradient in the case where the area ratio of the sliding surface was varied using the outer clutch plate having P=500 μm, and the long dashed double-short dashed line indicates a μ-v gradient in the case where the area ratio of the sliding surface was varied using the outer clutch plate having P=100 μm. In FIG. 6, the ordinate axis represents μ-v gradient, and the abscissa axis represents the area ratio S of the sliding surface 62b.

Consideration (I) of advantageous of effect (2) was conducted as follows. In the driving force transmission apparatus 1, the outer clutch plates 62 respectively having a groove pitch P of P=100 μm, 300 μm, 400 μm, 500 μm, 600 μm, 800 μm and each having the minute groove 62c with a groove depth D of D=15 μm and a groove width W of W=40 μm were prepared, the electromagnetic clutch 5 (cam mechanism 7) was actuated while rotating the housing 2, and then a μ-v gradient for the groove pitch P of the minute groove 62c was measured.

As a result, it was confirmed that the μ-v gradient is a positive gradient in 100 μm≤P≤600 μm and the favorable driving force transmission characteristic having excellent judder resistance is obtained.

Figure 7:
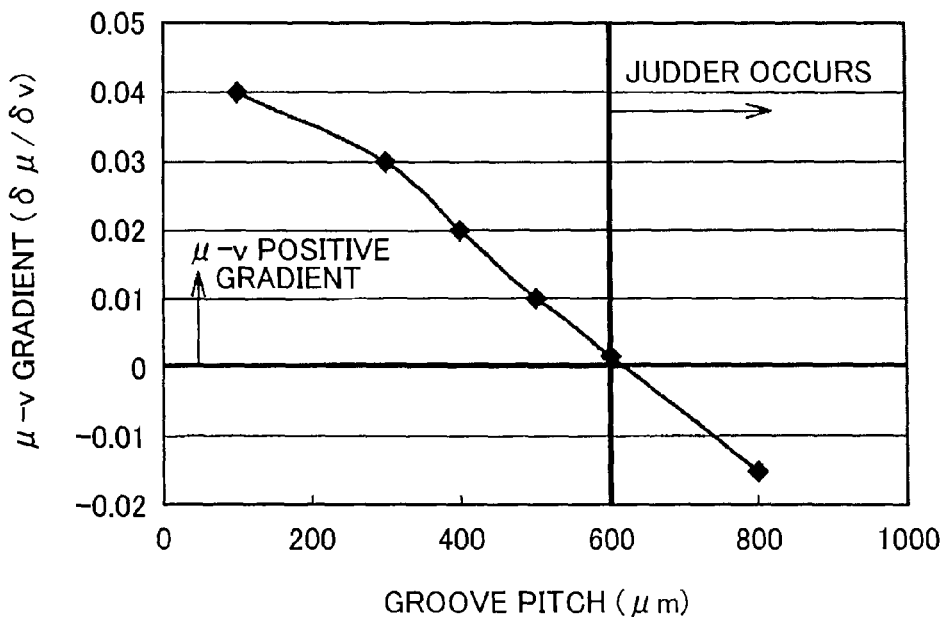
FIG. 7 is a graph that shows the correlation between a groove pitch of the minute groove and a μ-v gradient in each friction clutch plate of the one of the friction clutches of the driving force transmission apparatus according to the first embodiment of the invention.

This is as shown in FIG. 7. FIG. 7 shows the results of consideration of the correlation between a groove pitch P of the minute groove 62c and a μ-v gradient. In FIG. 7, the ordinate axis represents μ-v gradient, and the abscissa axis represents the groove pitch P of the minute groove 62c.

Consideration (II) of advantageous of effect (2) was conducted as follows. In the driving force transmission apparatus 1, the outer clutch plates 62 respectively having a groove pitch P of P=100 μm, 300 μm, 400 μm, 500 μm, 800 μm and each having the minute groove 62c with a groove depth D of D=15 μm and a groove width W of W=40 μm were prepared, the temperature (0° C., −10° C., −20° C.) of lubricant was varied, the electromagnetic clutch 5 (cam mechanism 7) was actuated while rotating the housing 2, and then a torque ratio (a transmitted torque in the case where a transmitted torque T at the time when the temperature of lubricant is 25° C. is set to T=1) for the groove pitch P of the minute groove 62c was measured.

As a result, it was confirmed that the torque ratio (a variation in transmitted torque between both clutch plates 61, 62) is reduced (an increase in transmitted torque at low temperatures is suppressed) as the groove pitch P increases. Particularly, it was confirmed that, when the groove pitch P falls within 400 μm≤P≤800 μm, the torque ratio is reduced at any temperature of lubricant.

Figure 8:
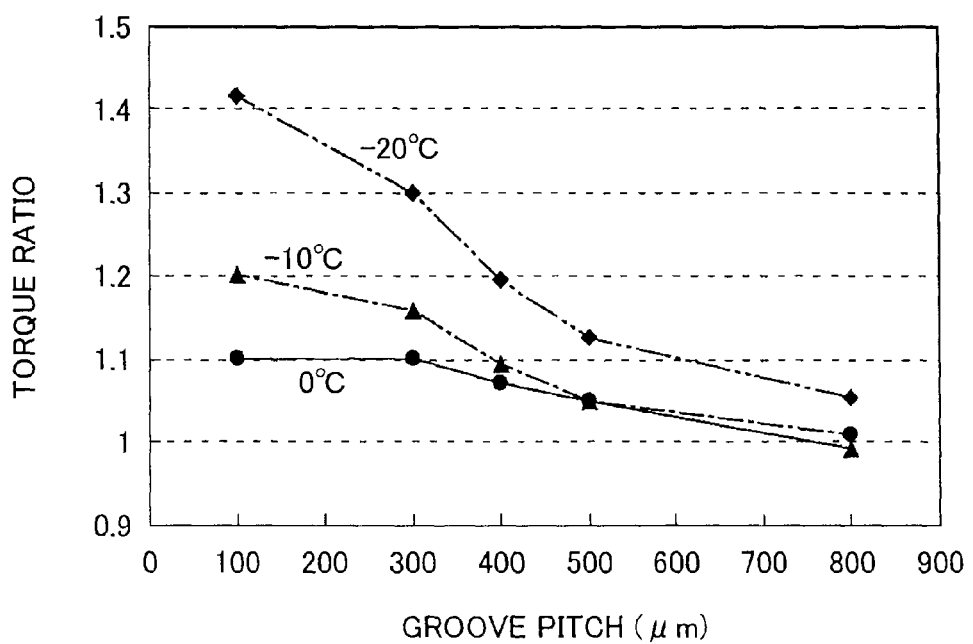
FIG. 8 is a graph that shows the correlation between a groove pitch of the minute groove and a torque ratio in each friction clutch plate of the one of the friction clutches of the driving force transmission apparatus according to the first embodiment of the invention.
Figure 9:
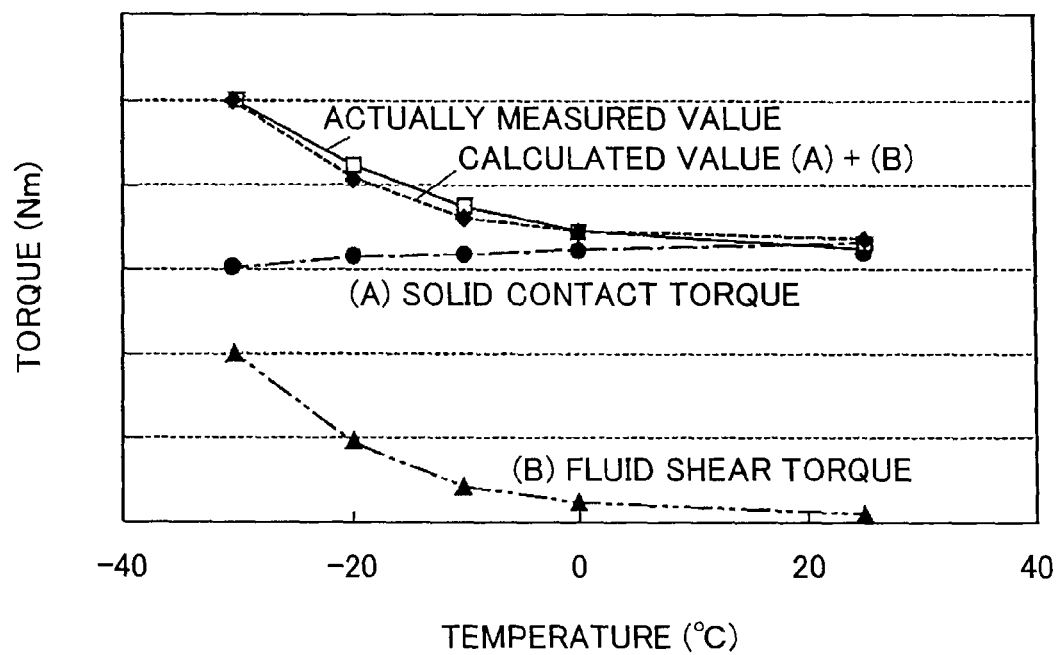
FIG. 9 is a graph that shows the correlation between a temperature of lubricant and a transmitted torque in each friction clutch plate of the one of the friction clutches of the driving force transmission apparatus according to the first embodiment of the invention.

This is as shown in FIG. 8. FIG. 8 shows the results of consideration of the correlation between a groove pitch of the minute groove and a torque ratio. In FIG. 8, the long dashed double-short dashed line indicates the case where the temperature of lubricant was set to −20° C., the long dashed short dashed line indicates the case where the temperature of lubricant was set to −10° C., and the continuous line indicates the case where the temperature of lubricant was set to 0° C. In FIG. 8, the ordinate axis represents torque ratio, and the abscissa axis represents the groove pitch P of the minute groove 62c.

According to the above-described considerations (I), (II) of the advantageous effect (2), it is possible to obtain the driving force transmission characteristic having judder resistance and a low temperature dependence in the case where the groove pitch P of the minute groove 62c falls within 400 μm≤P≤600 μm.

According to the above-described first embodiment, the following advantageous effects are obtained.

In the driving force transmission apparatus 1, the area ratio S of the sliding surface 62b is set to fall within 90%≤S≤96% in the initial state and the groove pitch P of the groove portions 620c is set to fall within 400 μm≤P≤600 μm, so it is possible to maintain the favorable driving force transmission characteristic having a low temperature dependence over an extended period of time.

In addition, in the present embodiment, the area α in the radial cross section of each groove portion 620c is larger than or equal to 200 μm$^2$, so it is possible to suppress hydraulic pressure reaction by accommodating lubricant in each groove portion 620c, and it is possible to suppress a decrease in the μ-v gradient (negative gradient). Furthermore, in the present embodiment, the area α in the radial cross section of each groove portion 620c is smaller than or equal to 700 μm$^2$, so it is possible to suppress an excessive transmitted torque due to an increase in the viscosity of lubricant held in each groove portion 620c at low temperatures (for example, lower than or equal to 0° C.) while ensuring the area ratio S of the sliding surface 62b.

Figure 10:
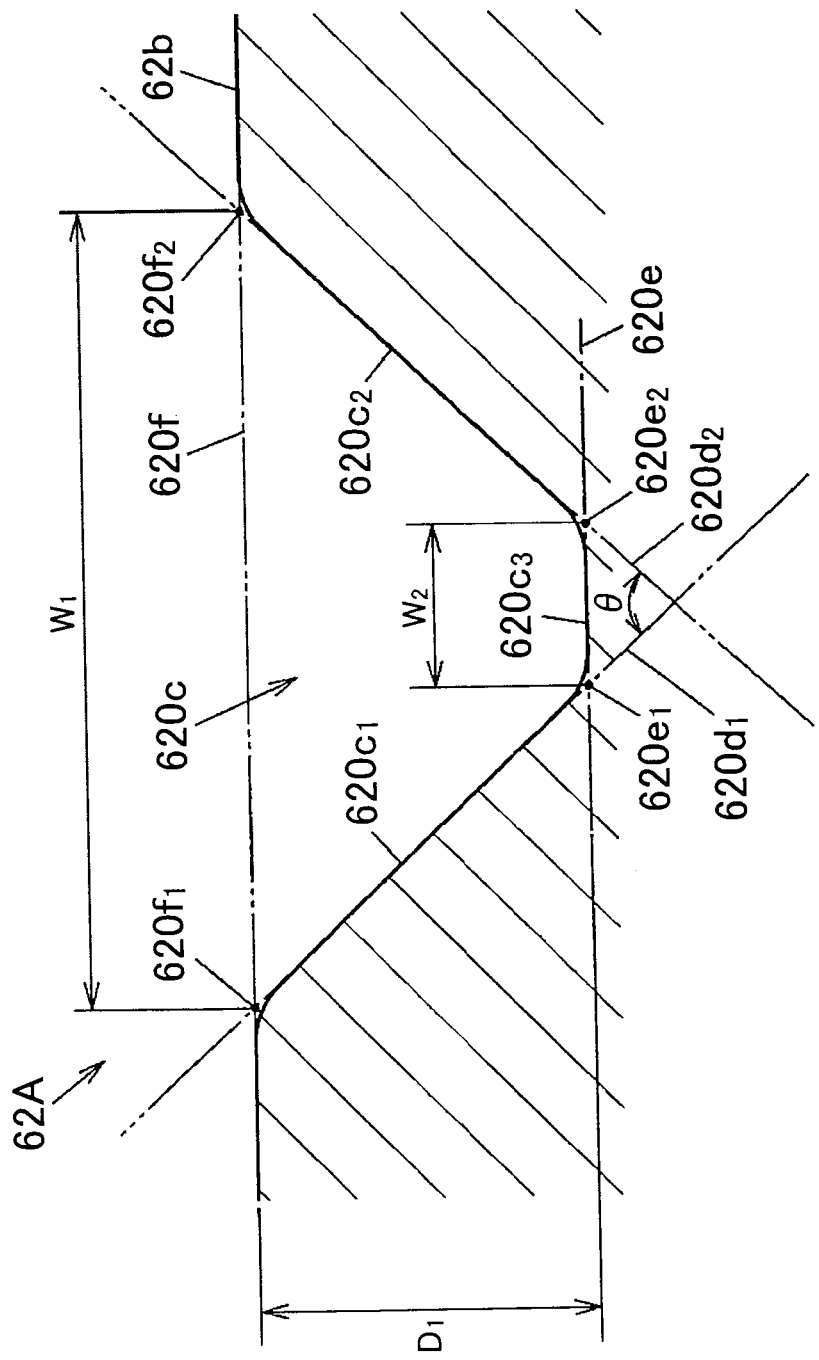
FIG. 10 is an enlarged sectional view of each groove portion in a radial cross section of each outer clutch plate according to a second embodiment of the invention.

FIG. 10 is an enlarged sectional view that shows each groove portion 620c in a radial cross section of each outer clutch plate 62A according to a second embodiment of the invention.

Each outer clutch plate 62A according to the present embodiment is formed similarly to each outer clutch plate 62 according to the first embodiment except the sectional shape of each of the groove portions 620c of the minute groove 62c. That is, the groove pitch P of the groove portions 620c is set to fall within 400 μm≤P≤600 μm, and the area ratio S of the sliding surface 62b is set to fall within 90%≤S≤96% in the initial state. The outer clutch plates 62A constitute the pilot clutch 6 together with the inner clutch plates 61 in which the diamond-like carbon coating 611 is formed, and transmit rotational force from the housing 2 to the pilot cam 71 of the cam mechanism 7.

Each of the groove portions 620c of each outer clutch plate 62A has a trapezoidal shape in the radial cross section of the outer clutch plate 62A, and the groove width gradually narrows from the opening, which is formed at the sliding surface 62b, toward the bottom. Each groove portion 620c is set such that the area α in the radial cross section perpendicular to the extending direction of the groove portions 620c falls within 200 μm$^2$≤α≤700 μm$^2$ in the initial state.

More specifically, as shown in FIG. 10, each groove portion 620c according to the present embodiment is set such that a groove width $W_1$ at the opening is, for example, 34 μm, a groove width $W_2$ at the bottom is, for example, 7 μm and a groove depth $D_1$ is, for example, 15 μm. Here, the groove width $W_2$ at the bottom is indicated by a distance between intersections 620e$_1$, 620e$_2$ of extension lines 620d$_1$, 620d$_2$ at the center portions in the depth direction on a pair of side surfaces 620c$_1$, 620c$_2$ facing in the radial direction of the outer clutch plate 62A in the groove portion 620c with an imaginary plane 620e including a deepest portion 620c$_3$ of the groove portion 620c and parallel to the sliding surface 62b. In addition, the groove width $W_1$ at the opening is indicated by a distance between intersections 620f$_1$, 620f$_2$ of the extension lines 620d$_1$, 620d$_2$ with an imaginary plane 620f including the sliding surface 62b. The groove depth $D_1$ is a distance between the imaginary planes 620e, 620f.

An angle θ made between the extension line 620d$_1$ of the side surface 620c$_1$ and the extension line 620d$_2$ of the side surface 620c$_2$ is desirably, for example, 70 to 100°. In the present embodiment, the angle θ is about 84°.

According to the present embodiment as well, similar advantageous effects to the advantageous effects described in the first embodiment are obtained. Each of the groove portions 620c has a trapezoidal shape in the radial cross section of the outer clutch plate 62A, so, in comparison with the case where the shape is a triangular shape, even when the sliding surface 62b abrades due to friction sliding with the adjacent inner clutch plate 61, it is possible to suppress a variation in groove width, and it is possible to maintain the favorable driving force transmission characteristic over a further extended period of time.

The friction clutch plate, the friction clutch and the driving force transmission apparatus according to the invention are described on the basis of the above-described embodiments. However, the invention is not limited to the above-described embodiments, the invention may be implemented in various forms without departing from the scope of the invention. For example, the following alternative embodiments are also possible.

In the above-described embodiments, the description is made on the case where the minute groove 62c is formed such that the groove portions 620c are arranged concentrically and independent of one another; however, the invention is not limited to this configuration. A spiral minute groove formed by connecting a plurality of groove portions is applicable. That is, in short, the invention just needs to include a minute groove formed of a plurality of groove portions having a predetermined groove pitch.

The groove pitch of the minute groove 62c and the size, such as the groove width and the groove depth, of each groove portion 620c in the above-described embodiments are not limited to the illustrated configurations. Of course, a minute groove having a groove pitch, groove depth and groove width set to other sizes is also applicable.

In the above-described embodiments, the description is made on the case where the sectional shape of each groove portion 620c is a triangular shape or a trapezoidal shape; however, the sectional shape of each groove portion 620c is not limited to this shape. The sectional shape of each groove portion 620c may be, for example, a circular arc shape or a rectangular shape.

In the above-described embodiments, the description is made on the case where the thin film on each inner clutch plate 61 is the DLC-Si coating containing silicon (Si); however, the invention is not limited to this configuration. The thin film on each inner clutch plate 61 may be a DLC coating that does not contain Si.

In the above-described embodiments, the description is made on the case where each inner clutch plate 61 is set as the contact object; however, the invention is not limited to this configuration. Each outer clutch plate may be set as the contact object. In this case, each inner clutch plate has a minute groove formed of a plurality of groove portions having a predetermined groove pitch, and the area ratio of the sliding surface is set to 90% to 96%.

In the above-described embodiments, the description is made on the case where the invention is applied to the pilot clutch 6; however, the invention is not limited to this configuration. The invention may be applied to not only the pilot clutch but also the main clutch or may be applied to only the main clutch. That is, in short, the invention may be applied to at least one of a first friction clutch and a second friction clutch. In addition, the friction clutch plate according to the invention may be applied to another clutch plate as long as the clutch plate has a minute groove formed of a plurality of groove portions having a predetermined groove pitch.

What is claimed is:

1. A friction clutch plate that is arranged to face a contact object so as to be relatively rotatable and relatively movable, comprising:
   a contact surface configured to be able to contact the contact object via lubricant; and
   a minute groove open at the contact surface and formed of a plurality of groove portions having a predetermined groove pitch, wherein
   a ratio of a contact area of the contact surface to an area obtained by adding an opening area of the minute groove to the contact area of the contact surface is 90% to 96% in an initial state,
   wherein the minute groove is set such that the groove pitch of the plurality of groove portions falls within the range of 400 µm to 600 µm, and
   wherein each of the groove portions has a shape in cross section perpendicular to an extending direction of the groove portions whose width becomes smaller toward a bottom of the groove, such that the µ-v gradient with respect to an area ratio of the sliding surface has a non-negative value.

2. The friction clutch plate according to claim 1, wherein the contact surface faces a diamond-like carbon coating provided on the contact object.

3. The friction clutch plate according to claim 1, wherein an area of the groove portions in cross section perpendicular to an extending direction of each groove portion is set to fall within the range of 200 µm² to 700 µm².

4. The friction clutch plate according to claim 1, wherein the plurality of groove portions of the minute groove are independent of each other and are arranged concentrically as annular recessed grooves.

5. The friction clutch plate according to claim 1, wherein each of the groove portions has a trapezoidal shape in cross section perpendicular to an extending direction of the groove portions.

6. A friction clutch comprising:
   a plurality of clutch plates of which any adjacent two clutch plates are configured to be able to frictionally engage with each other, wherein
   one of the any adjacent two clutch plates among the plurality of clutch plates is the friction clutch plate according to claim 1.

7. A driving force transmission apparatus comprising:
   a first rotating member configured to rotate by driving torque of a drive source;
   a second rotating member arranged relatively rotatably with respect to the first rotating member along a rotation axis of the first rotating member;
   an electromagnetic clutch including a first friction clutch and configured to couple the second rotating member to the first rotating member so as to be able to interrupt the second rotating member from the first rotating member;
   a second friction clutch configured to be actuated by clutch action of the electromagnetic clutch; and
   a cam mechanism configured to receive rotational force from the first rotating member by clutch action of the second friction clutch and then convert the rotational force to cam thrust force that becomes clutch action force of the first friction clutch, wherein
   at least one of the first friction clutch and the second friction clutch is the friction clutch according to claim 6.

8. The friction clutch plate according to claim 1, wherein the plurality of groove portions of the minute groove are independent of each other and are arranged concentrically around the rotation axis as annular recessed grooves.

9. The friction clutch plate according to claim 8, wherein the groove pitch is 500 µm.

10. The friction clutch plate according to claim 9, wherein the groove depth is 15 µm.

11. The driving force transmission apparatus according to claim 7, wherein the plurality of groove portions of the minute groove are independent of each other and are arranged concentrically around the rotation axis as annular recessed grooves.

12. The driving force transmission apparatus according to claim 11, wherein the groove pitch is 500 µm and the groove depth is 15 µm.

13. A friction clutch plate that is arranged to face a contact object so as to be relatively rotatable and relatively movable, comprising:
   a contact surface configured to be able to contact the contact object via lubricant; and
   a minute groove open at the contact surface and formed of a plurality of groove portions having a predetermined groove pitch, wherein
   a ratio of a contact area of the contact surface to an area obtained by adding an opening area of the minute groove to the contact area of the contact surface is 90% to 96% in an initial state,
   wherein the minute groove is set such that the groove pitch of the plurality of groove portions falls within the range of 400 µm to 600 µm, and
   wherein each of the groove portions has a shape in cross section perpendicular to an extending direction of the groove portions whose width becomes smaller toward a bottom of the groove, such that the µ-v gradient with respect to an area ratio of the sliding surface has a non-negative value and the driving force transmission characteristic has judder resistance.

14. The friction clutch plate according to claim 13, wherein the contact surface faces a diamond-like carbon coating provided on the contact object.

15. The friction clutch plate according to claim 13, wherein an area of the groove portions in cross section perpendicular to an extending direction of each groove portion is set to fall within the range of 200 µm² to 700 µm².

16. The friction clutch plate according to claim 13, wherein the plurality of groove portions of the minute groove are independent of each other and are arranged concentrically as annular recessed grooves.

17. The friction clutch plate according to claim 13, wherein each of the groove portions has a trapezoidal shape in cross section perpendicular to an extending direction of the groove portions.

18. The friction clutch plate according to claim 13, wherein the plurality of groove portions of the minute groove are independent of each other and are arranged concentrically around the rotation axis as annular recessed grooves.

* * * * *